United States Patent Office 3,836,646
Patented Sept. 17, 1974

3,836,646
PHARMACEUTICAL COMPOSITION ESSENTIALLY CONTAINING, AND METHOD OF TREATMENT WITH, $\Delta^{4,20,22}$-BUFATRIENOLIDE RHAMNOSIDE ETHERS
Hugo Kubinyi, Leimen, Germany, assignor to Knoll A.G. Chemische Fabriken, Ludwigshafen (Rhine), Germany
No Drawing. Original application Feb. 25, 1970, Ser. No. 14,218, now Patent No. 3,726,857. Divided and this application Dec. 1, 1972, Ser. No. 311,249
Int. Cl. A61k 27/14
U.S. Cl. 424—182                                       15 Claims

ABSTRACT OF THE DISCLOSURE

Cardioactive $\Delta^{4,20,22}$-bufatrienolide rhamnoside ethers of the formula

[Structural formula]

wherein R is methyl or formyl; $R_1$ and $R_2$ taken alone are hydrogen, lower alkyl, or acetyl; $R_1$ and $R_2$ taken together are $$\diagup C \diagdown \begin{matrix} CH_3 \\ CH_3 \end{matrix} ;$$

$R_3$ is hydrogen, lower alkyl, or acetyl; and wherein at least one of $R_1$, $R_2$, or $R_3$ is alkyl, and the method of preparing them by reaction of the corresponding 2′,3′,4′-hydroxy compounds or 2′,3′-isopropylidene-4′-hydroxy compounds with an alkyl halide, optionally followed by hydrolysis of the isopropylidene group and/or acetylation of unetherified hydroxy groups.

---

This is a division of application Ser. No. 14,218, filed Feb. 25, 1970, now Pat. No. 3,726,857.

The present invention relates to $\Delta^{4,20,22}$-bufatrienolide rhamnoside ethers and ether-acylates and to methods of making the same.

Many of the cardioglycosides important for the therapy of cardiac insufficiency in humans contains methylated sugar, e.g. digitalose (digitalinum verum); oleandrose (oleandrin); cymarose (strophanthoside, strophanthin, cymarin); and thevetose (thevetin, neriifolin, and peruvoside).

All of the glycosides mentioned have the methoxyl group in the 3′-position of the sugar. However, glycosides are also known which have a methyl group on the 2′-hydroxy group, as are glycosides having a methyl group on each of the 2′- and 3′-hydroxy groups [cf. the summary of T. Reichstein et al. in Adv. Carboh. Chem., 17, 65 (1962)].

It is of course known that the structure of the sugar or of the sugar chain has an influence on the efficacy of a cardioglycoside [B. Baumgarten, Die Herzwirksamen Glykoside, VEB Georg Thieme-Verlag, Leipzig (1963), page 242]. However, heretofore it has not been possible to investigate quantitatively the influence of the position and number of ether groups present on the sugar on the pharmaceuticological properties of cardioglycosides because insufficient material for purposes of comparison was at hand.

It has already been attempted to prepare ethers from cardioglycosides by a partial synthesis. Makarevich describes the synthesis of cymarin from helveticoside [I. F. Makarevich, Med. Prom. SSSR, 29 (1967)], as well as the synthesis of k-strophanthin-$\beta$ from glucohelveticoside [I. F. Makarevich, Khim. Prirod. Soedin, 217 (1967)].

Dutch patent application 6717502 further describes the preparation of helveticoside diethers from helveticoside or cymarin, and German Pat. 1,162,835 describes the preparation of the 19-methyl ether of 19-hydroxy cardenolides having an acyloxy group or glycoside group on the 3-carbon atom.

The references cited above teach either the formation of known cardioglycosides, or of fully etherified cardioglycosides which have no free hydroxyl groups on the sugar, or of cardioglycosides which have an additional methyl group present on the aglycone but whose sugar portion remains unchanged. In no case are new compounds obtained having one or more additional ether groups on the sugar chain together with one or more free hydroxyl groups thereon.

The present invention relates more in particular to the preparation of new, defined, $\Delta^{4,20,22}$-bufatrienolide rhamnoside ethers of the general formula

[Structural formula]

wherein R is methyl or formyl; $R_1$ and $R_2$ taken separately are hydrogen, lower alkyl, or acetyl; $R_1$ and $R_2$ taken together form the group $$\diagup C \diagdown \begin{matrix} CH_3 \\ CH_3 \end{matrix} ;$$

$R_3$ is hydrogen, acetyl, or lower alkyl; and wherein at least one of the groups $R_1$, $R_2$, or $R_3$ is alkyl.

The present invention further relates more in particular to a process for the preparation of $\Delta^{4,20,22}$-bufatrienolide rhamnoside ethers of the formula given above by reaction of a $\Delta^{4,20,22}$-bufatrienolide rhamnoside derivative of the formula

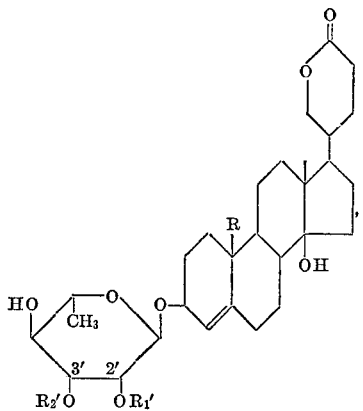

wherein R is as earlier described; $R_1'$ and $R_2'$ taken alone are hydrogen; or $R_1'$ and $R_2'$ taken together form the group

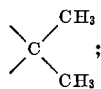

with an alkyl halide in an inert organic solvent in the presence of a base. The product mixtures obtained can, if desired, be separated by column chromatography and/or by fractional crystallization and/or by countercurrent distribution. Further, any isopropylidene residue present in the compound may be split off and/or free hydroxy groups in the sugar residue may be acetylated if desired.

Alkyl iodides are particularly suitable as alkyl halides for use in the reaction of the invention. The corresponding bromides and chlorides, particularly the methyl and compounds, are not so easily obtainable as the iodides because of their greater volatility. However, the reaction also takes place with these compounds.

As bases for use in the reaction, alkaline earth hydroxides, mixtures of alkaline earth hydroxides and oxides, alkali metal hydrides and alcoholates such as sodium hydride and sodium methylate, and silver oxide are preferred. If the reaction is carried out with alkaline earth hydroxides or oxides, or with sodium hydride, dimethyl formamide is preferably used as the solvent medium. If silver oxide is used as the base, the reaction can also be carried out as well as in inert organic solvents such as acetone, tetrahydrofuran, or dioxane, for example.

For reaction, the reagents are suitably contacted at a temperature between about 0° C. and 50° C. Most reactions are conveniently carried out at room temperature, 20° C. As is evident from the specific examples given later herein, reaction times extending from a few minutes to several hours are used, depending on the specific reagents employed and the other conditions of the reaction. Those skilled in the art will choose the shortest time giving good yields, as for any other chemical reaction.

The assignment of structure to the resulting proscillaridin and 19-oxo-proscillaridin monoethers is accomplished by nuclear magnetic resonance (NMR) spectroscopy, treatment with sodium periodate and acetonide formation. The assignment of structure to the resulting proscillaridin and 19-oxo-proscillaridin dimethylethers is accomplished by specific syntheses from the pure monomethyl ethers and DC-comparison of the reaction products, as well as by NMR-spectroscopy. For all the proscillaridin ethers, the NMR-spectra of the acetylated ethers were also employed for structure studies.

With the help of NMR-spectroscopy, proscillaridin- and 19-oxo-proscillaridin-methyl ether mixtures can be analzed. This requires both the NMR-spectra of the methyl ether mixture and, after acetylation of a small sample of the mixture, of the acetates of the methyl ether mixture. For example, the composition of a proscillaridin-monomethyl ether mixture can be determined in the following manner.

Percent content of 4'-methylether in the mixture $$= \frac{\text{Area under the 4'-OCH}_3\text{-signal} \times 100}{\text{Area under all OCH}_3\text{-signals}}$$

Percent content of 3'-methylether in the mixture $$= \frac{\text{Area under the 3'-OCH}_3\text{-signal in the diacetate mixture} \times 100}{\text{Area under all OCH}_3\text{-signals in the diacetate mixture}}$$

Percent content of 2'-methylether in the mixture
= 100% − (percent content of 3'- and 4'-methylethers)

The composition of a proscillaridin dimethylether mixture can be determined in the folowing manner:

Percent content of 2', 3'-dimethylether in the mixture $$= \frac{\text{Area under the 4'-O-acetyl signal in the dimethylether-acetate mixture} \times 100}{\text{Total area under the O-acetyl signal in the dimethylether-acetate mixture}}$$

Percent content of 3', 4'-dimethylether in the mixture $$= \frac{\text{Area under the OCH}_3\text{-signal of the 3', 4'-dimethylether-2'-acetate in the dimethylether-acetate mixture} \times 100}{\text{Total area under the OCH}_3\text{-signal in the dimethylether-acetate mixture}}$$

Percent content of 2', 4'-methylether in the mixture
= 100% − (percent content of 2', 3'- and 3', 4'-dimethylethers).

The monomethylether mixtures and dimethylether mixtures can additionally be analyzed with the aid of preparative thin layer chromatography, elution of the zones, and quantitative determination with UV-spectroscopy. For monomethylether or monoethylether mixtures, cleavage with sodium periodate and titration of the consumed reagent, or quantitative thin layer chromatography, can also be used for determination of the 3'-ether.

The data necessary for assignment of structure and for analysis of the mixtures can be taken from the following tables, in which Table I presents a summary of the $R_f$ values, Table II is a review of the chemical properties, and Table III presents NMR data for several of the compounds of interest. In Table III the chemical displacement, δ, is given in p.p.m. ($δ_{Tetramethylsilane}$=0.00 p.p.m.); the couplings, J, are given in Hertz. The following abbreviations are used in Table III: s=singlet; d=doublet; t=triplet; q=quadruplet; m=multiplet; br=broad.

TABLE Ia

Rf-values of proscillaridin- and 19-oxo-proscillaridin mono- and di-derivatives

[On silica gel (HF-Merck) without chamber saturation]

| Compound | Ethyl acetate | Chloroform/acetone equal— | | |
|---|---|---|---|---|
| | | 4/1 | 2/1 | 1/1 |
| Proscillaridin-2'-methylether | 0.28 | 0.10 | 0.26 | 0.47 |
| Proscillaridin-3'-methylether | 0.30 | 0.10 | 0.27 | 0.51 |
| Proscillaridin-4'-methylether | 0.37 | 0.10 | 0.28 | 0.53 |
| 19-Oxo-proscillaridin-3'-methylether | 0.23 | 0.07 | 0.18 | 0.41 |
| 19-Oxo-proscillaridin-4'-methylether | 0.27 | 0.07 | 0.18 | 0.43 |
| Proscillaridin-3'-ethylether | 0.47 | 0.17 | 0.40 | 0.67 |
| Proscillaridin-4'-ethylether | 0.48 | 0.15 | 0.35 | 0.65 |
| Proscillaridin-2',3'-dimethylether | 0.47 | 0.32 | 0.53 | 0.71 |
| Proscillaridin-2',4'-dimethylether | 0.55 | 0.35 | 0.58 | 0.75 |
| Proscillaridin-3',4'-dimethylether | 0.59 | 0.35 | 0.60 | 0.79 |
| 19-Oxo-proscillaridin-2',3'-dimethylether | 0.34 | 0.20 | 0.42 | 0.66 |
| 19-Oxo-proscillaridin-2',4'-dimethylether | 0.41 | 0.22 | 0.46 | 0.69 |
| 19-Oxo-proscillaridin-3',4'-dimethylether | 0.41 | 0.22 | 0.46 | 0.69 |
| Proscillaridin-3'-methylether-4'-acetate | 0.69 | 0.38 | 0.63 | 0.81 |

TABLE Ib

Rf-values of proscillaridin- and 19-oxo-proscillaridin tri-derivatives

[On silica gel (HF-Merck) without chamber saturation]

| Compound | Chloroform/ethyl acetate equal— | | |
|---|---|---|---|
| | 4/1 | 2/1 | 1/1 |
| Proscillaridin-2',3',4'-trimethylether | 0.13 | 0.21 | 0.40 |
| 19-Oxo-proscillaridin-2',3',4'-trimethylether | 0.06 | 0.10 | 0.23 |
| Proscillaridin-2',3'-acetonide-4'-methylether | 0.28 | 0.43 | 0.67 |
| 19-Oxo-proscillaridin-2',3'-acetonide-4'-methylether | 0.06 | 0.10 | 0.25 |
| Proscillaridin-2',3'-acetonide-4'-ethylether | 0.31 | 0.48 | 0.71 |
| Proscillaridin-2'-methylether-3',4'-diacetate | 0.15 | 0.25 | 0.51 |
| Proscillaridin-3'-methylether-2',4'-diacetate | 0.15 | 0.26 | 0.54 |
| Proscillaridin-4'-methylether-2',3'-diacetate | 0.16 | 0.28 | 0.55 |
| Proscillaridin-2',3'-dimethylether-4'-acetate | 0.11 | 0.19 | 0.38 |
| Proscillaridin-2',4'-dimethylether-3'-acetate | 0.17 | 0.25 | 0.50 |
| Proscillaridin-3',4'-dimethylether-2'-acetate | 0.15 | 0.24 | 0.49 |
| Proscillaridin-3'-ethylether-2',4'-diacetate | 0.22 | 0.35 | 0.57 |
| Proscillaridin-4'-ethylether-2',3'-diacetate | 0.22 | 0.35 | 0.56 |

TABLE IIa

Chemical properties of proscillaridin- and 19-oxo-proscillaridin-mono-ethers

| Compound | NaIO₄ cleavage | Acetonide formation |
|---|---|---|
| Proscillaridin-2'-methylether | + | − |
| Proscillaridin-3'-methylether | + | − |
| Proscillaridin-4'-methylether | + | + |
| 19-Oxo-proscillaridin-3'-methylether | + | − |
| 19-Oxo-proscillaridin-4'-methylether | + | + |
| Proscillaridin-3'-ethylether | + | − |
| Proscillaridin-4'-ethylether | + | + |

TABLE IIb

Structural assignment of proscillaridin-dimethylethers by partial methylation of proscillaridin-monomethylethers

| Dimethylether | Obtained by Partial methylation of— | | |
|---|---|---|---|
| | Proscillaridin-2'-methylether | Proscillaridin-3'-methylether | Proscillaridin-4'-methylether |
| Proscillaridin-2',3'-dimethylether | + | + | − |
| Proscillaridin-2',4'-dimethylether | + | − | + |
| Proscillaridin-3',4'-dimethylether | − | + | + |

TABLE IIIa

NMR data for proscillaridin-methylethers

| | Proscillaridin-2'-methylether | Proscillaridin-3'-methylether | Proscillaridin-4'-methylether | Proscillaridin-2',3'-dimethylether | Proscillaridin-2',4'-dimethylether | Proscillaridin-3',4'-dimethylether | Proscillaridin-2',3',4'-trimethylether | Proscillaridin-2',3'-acetonide-4'-methylether |
|---|---|---|---|---|---|---|---|---|
| H-1' | 5.07 (s) | 5.00 (d; J=1.5) | 4.97 (s) | 5.10 (d; J=1) | 5.08 (br. s) | 5.02 (d; J=1) | 5.07 (br. s) | 5.18 (sharp s) |
| H-2' | | 4.07 (q; J₁=1, J₂=2) | | | | 4.06 (q; J₁=1, J₂=3) | | 4.15-4.22 (AB-system) |
| H-3' | 3.3-4.0 (complex system) | 3.3-4.0 (complex system) | 3.3-4.0 (complex system) | 3.4-4.0 (complex system) | 3.4-3.8 (complex system) | 3.4-3.9 (not assignable) | 3.4-3.8 (complex system) | ca. 3.0 (complex multiplet) |
| H-4' | | | 3.09 (br. t, J₁=J₂=9-10) | | 3.93 (q; J₁=4, J₂=10) | 3.09 (t; J₁=J₂=9) | 3.15 (t; J₁=J₂=9-10) | 5.5-3.9 (m) |
| H-5' | | | 3.3-4.0 (not assignable) | | 3.02 (t; J₁=J₂=9-10) | 3.4-3.9 (not assignable) | 3.4-3.8 (not assignable) | |
| H-6' | 1.31 (d; J=6) | 1.31 (d; J=6) | 1.22 (d; J=6) | 1.31 (d; J=5.5) | 1.30 (d; J=6.5) | 1.30 (d; J=6.5) | 1.29 (d; J=6) | 1.27 (d; J=6) |
| H-18 | 0.75 (s) | 0.75 (s) | 0.75 (s) | 0.74 (s) | 0.75 (s) | 0.74 (s) | 0.75 (s) | 0.74 (s) |
| H-19 | 1.07 (s) | 1.07 (s) | 1.05 (s) | 1.06 (s) | 1.05 (s) | 1.05 (s) | 1.05 (s) | 1.07 (s) |
| —OCH₃ | 3.58 (s) | 3.50 (s) | 3.59 (s) | 3.50 and 3.54 (s) | 3.55 and 3.61 (s) | 3.53 and 3.58 (s) | 3.51, 3.54 and 3.58 (s) | 3.56 (s) |

TABLE IIIb

NMR data for 19-oxo-proscillaridin-methylethers

| | 19-oxo-proscillaridin-2'-methylether | 19-oxo-proscillaridin-3'-methylether | 19-oxo-proscillaridin-4'-methylether | 19-oxo-proscillaridin-2',3'-dimethylether | 19-oxo-proscillaridin-2',4'-dimethylether | 19-oxo-proscillaridin-3',4'-dimethylether | 19-oxo-proscillaridin-2',3',4'-trimethylether | 19-oxo-proscillaridin-2',3'-acetonide-4'-methylether |
|---|---|---|---|---|---|---|---|---|
| H-1' | 4.98 (br.) | 4.93 (br. s) | 5.06 (br. s) | | 5.0 (br.) | 5.0 (br.) | 5.04 (br.) | 5.16 (sharp s) |
| H-2' | | | | | | | | 4.1-4.2 (AB-system) |
| H-3' | 3.1-4.0 (complex system) | 3.3-4.0 (complex system) | 3.3-4.0 (complex system) | | 3.4-4.0 (complex system) | 3.4-4.0 (complex system) | 3.0-4.0 (complex system) | 3.0 (m) |
| H-4' | | 3.08 (br. t; J₁=J₂=9-10) | | | ca. 3.0 (m) | 3.4-4.0 (not assignable) | | 3.7 (m) |
| H-5' | | 3.3-4.0 (not assignable) | | | 3.4-4.0 (not assignable) | | | |
| H-6' | 1.28 (d; J=6) | 1.29 (d; J=6) | 1.29 (d; J=6) | | 1.29 (d; J=6) | 1.29 (d; J=6) | 1.33 (d; J=6) | 1.26 (d; J=6) |
| H-18 | 0.72 (s) | 0.84 (s) | 0.73 (s) | | 0.72 (s) | 0.72 (s) | 0.75 (s) | 0.74 (s) |
| H-19 | 9.82 (s) | 9.84 (s) | 9.82 (s) | | 9.82 (s) | 9.82 (s) | 9.80 (s) | 9.82 (s) |
| —OCH₃ | 3.49 (s) | 3.59 (s) | 3.50 and 3.52 (s) | | 3.50 and 3.56 (s) | 3.53 and 3.59 (s) | 3.50, 3.53 and 3.57 (s) | 3.57 (s) |

TABLE IIIC

NMR data for proscillaridin-methylether-acetates

| | Proscillaridin-2'-methylether-3',4'-diacetate | Proscillaridin-3'-methylether-4'-acetate | Proscillaridin-3-methylether-2',4'-diacetate | Proscillaridin-4'-methylether-2',3'-diacetate |
|---|---|---|---|---|
| H–1' | 5.02 (d; J=1) | 5.06 | 4.96 (d; J=1) | 4.91 (br. s). |
| H–2' | 3.62 (br.) | 4.11 (q; $J_1$=1.5, $J_2$=3.5) | Ca. 5.35 (br.) | 5.22–5.37 (AB-system). |
| H–3' | {5.0–5.4 (AB-m) | {3.57 (q; $J_1$=3.5, $J_2$=9.5) | 3.65 (q; $J_1$=4, $J_2$=10) | |
| H–4' | | {5.04 (t; $J_1$=$J_2$=9.5) | 5.02 (t; $J_1$=$J_2$=10) | 3.24 (br. t; $J_1$=$J_2$=10). |
| H–5' | ~3.9 (m) | 3.90 (m; $J_1$=6.5, $J_2$=9.5) | 3.91 (m; $J_1$=6.5, $J_2$=10) | 3.6–4.1 (not assignable). |
| H–6' | 1.20 (d; J=6.5) | 1.17 (d; J=6.5) | 1.20 (d; J=6.5) | 1.33 (d; J=6.5). |
| H–18 | 0.74 (s) | 0.75 | 0.74 (s) | 0.74 (s). |
| H–19 | 1.07 (s) | 1.07 (s) | 1.07 (s) | 1.05 (s). |
| –OCH$_3$ | 3.52 (s) | 3.43 (s) | 3.36 (s) | 3.51 (s). |
| –OAc | 2.04 and 2.08 (s) | 2.09 (s) | 2.10 and 2.16 (d) | 2.06 and 2.15 (s). |

| | Proscillaridin-2',3'-dimethylether-4'-acetate | Proscillaridin-2',4'-dimethylether-3'-acetate | Proscillaridin-3',4'-dimethylether-2'-acetate |
|---|---|---|---|
| H–1' | 5.08 (s) | 5.00 (br. s) | 4.90 (d; J=1). |
| H–2' | 3.4–3.8 (not assignable) | 3.4–3.9 (not assignable) | 5.29 (q; $J_1$=1, $J_2$=4). |
| H–3' | 3.95 (q; $J_1$=4, $J_2$=10) | 5.22 (q; $J_1$=3.5, $J_2$=9.5) | 3.4–3.9 (not assignable). |
| H–4' | 5.07 (t; $J_1$=$J_2$=10) | 3.11 (t; $J_1$=$J_2$=9–10) | 3.10 (t; $J_1$=$J_2$=9–10). |
| H–5' | 3.4–3.8 (not assignable) | 3.4–3.9 (not assignable) | 3.4–3.9 (not assignable). |
| H–6' | 1.17 (d; J=6.5) | 1.31 (d; J=6) | 1.31 (d; J=6). |
| H–18 | 0.75 (s) | 0.74 (s) | 0.74 (s). |
| H–19 | 1.09 (s) | 1.05 (s) | 1.05 (s). |
| –OCH$_3$ | 3.46 and 3.56 (s) | 3.45 and 3.59 (s) | 3.51 (s) (2 –OCH$_3$). |
| –OAc | 2.11 (s) | 2.16 (s) | 2.16 (s). |

TABLE IIID

NMR data for proscillaridin-ethylethers

| | Proscillaridin-3'-ethylether | Proscillaridin-4'-ethylether | Proscillaridin-2'-3'-acetonide-4'-ethylether |
|---|---|---|---|
| H–1' | 4.98 (d; J=1.5 | 4.96 (s) | 5.18 (sharp s). |
| H–2' | 4.03 (q; $J_1$=1, $J_2$=2) | {3.5–4.0 (not assignable) | 4.15–4.22 (AB-system). |
| H–3' | } | | |
| H–4' | }3.4–4.0 (complex system) | 3.17 (br. t; $J_1$=$J_2$=9–10) | Ca. 3.15 (m). |
| H–5' | } | 3.5–4.0 (not assignable) | 3.4–4.0 (not assignable). |
| H–6' | 1.32 (d; J=6) | 1.30 (d; J=6.5) | 1.32 (d; J=6.5). |
| H–18 | 0.75 (s) | 0.74 (s) | 0.73 (s). |
| H–19 | 1.07 (s) | 1.04 (s) | 1.05 (s). |
| — | 3.4–3.8 (m) | 3.6–4.0 (m) | 3.6–3.9 (m). |
| –OC$_2$H$_5$ | 1.25 (t; J=6.5) | 1.22 (t; J=7) | 1.23 (t; J=6.5). |

TABLE IIIE

NMR data for proscillaridin-ethylether-acetates

| | Proscillaridin-3'-ethylether-2',4'-diacetate | Proscillaridin-4'-ethylether-2',3'-diacetate |
|---|---|---|
| H–1' | 4.99 (d; J=1) | 4.89 (br. s). |
| H–2' | 5.29 (q; $J_1$=1, $J_2$=3) | {5.20—5.36 (AB-system). |
| H–3' | 3.4—4.0 (m; not assignable) | |
| H–4' | 5.00 (t; $J_1$=$J_2$=9–10) | 3.28 (br. t; $J_1$=$J_2$=9–10). |
| H–5' | 3.4–4.0 (not assignable) | 3.4–4.0 (not assignable). |
| H–6' | 1.19 (d; J=6) | 1.33 (d; J=6). |
| H–18 | 0.74 (s) | 0.74 (s). |
| H–19 | 1.07 (s) | 1.05 (s). |
| –OC$_2$H$_5$ | 3.4–4.0 (m) | 3.68 (q; J=7). |
| | 1.11 (t; J=7) | 1.28 (t; J=7). |
| –OAc | 2.08 and 2.15 (s) | 2.05 and 2.15 (s). |

The new compounds possess very good cardioactivity and are readily resorbable. The following Table IV shows the superior effect of the new compounds in comparison with proscillaridin.

TABLE IV

| Compound | Cardioactivity (in mg./kg.) intravenously in— | | Enteral resorption cats (in percent) |
|---|---|---|---|
| | Guinea pigs | Cats | |
| Proscillaridin-2'-methylether | 0.27 | 0.13 | 100 |
| Proscillaridin-3'-methylether | 0.32 | 0.08 | 54 |
| Proscillaridin-4'-methylether | 0.67 | 0.15 | 70 |
| Proscillaridin-2'-3'-dimethylether | 0.30 | 0.16 | 100 |
| Proscillaridin-2',4'-dimethylether | 0.38 | 0.23 | 84 |
| Proscillaridin-3',4'-dimethylether | | 0.19 | 76 |
| Proscillaridin-2',3',4'-trimethylether | | 0.40 | 100 |
| Proscillaridin-3'-methylether-2'-acetate | 0.38 | 0.11 | 71 |
| Proscillaridin-3'-ethylether | 0.24 | 0.12 | 94 |
| Proscillasidin-4'-ethylether | 0.74 | 0.20 | 100 |
| Proscillaridin | 0.45 | 0.15 | 34 |

The determination of cardioactivity in guinea pigs is according to Knaffl-Lenz, J. Pharm. Exp. Ther. *29*, 407 (1926) and that in cats is according to Hatcher et al., Am. J. Pharm., *82*, 360 (1910). Enteral resorption in cats is determined according to R. Hotovy, Arzneimittelforschung, *1*, 160 (1951).

The new compounds can be administered orally in pharmaceutically conventional forms such as tablets, dragees, capsules, solutions, and the like. The dosage range is between 0.2 and 3.0 mg. per patient per day.

A better understanding of the present invention and of its many advantages will be had by referring to the following specific examples given by way of illustration.

EXAMPLE 1

5 g. of proscillaridin were stirred for 6 hours at 20° C. with 20 ml. of methyl iodide and 10 g. of silver oxide in 100 ml. of dioxane. The batch was filtered, the residue washed thoroughly with ethyl acetate, the filtrate evaporated, and the residue chromatographed on inactivated silica gel in a column 110 x 5 cm. with the system chloroform/acetone=2/1. The following were obtained:

0.58 g. of proscillaridin-dimethylether mixture (11% of theory), $R_f$-value=0.47–0.59 in ethyl acetate; 2.76 g. of proscillaridin-monomethylether mixture (54 percent of theory), $R_f$-value=0.28–0.37 in ethyl acetate; and 1.22 g. of proscillaridin (24% of the starting material).

Crystallization of 2.76 g. of proscillaridin-monomethyl ether mixture from 25 ml. of ethyl acetate gave 1.29 g. of crystalline proscillaridin - 3' - methyl ether, m.p. 235°–242° C.; $R_f$-value=0.30 in ethyl acetate.

EXAMPLE 2

5 g. of proscillaridin were stirred for 2 hours at 20° C. with 30 g. of silver oxide and 30 ml. of methyl iodide in 100 ml. of dimethylformamide. The batch was filtered, the residue thoroughly washed with ethyl acetate, and the filtrate evaporated. After column chromatography on inactivated silica gel using a column 100 x 6 cm. with ethyl acetate, the following was obtained: 1.30 g. of proscillaridin-monomethylether mixture (25% of theory), $R_f$-value=0.28–0.37 in ethyl acetate.

EXAMPLE 3

5 g. of proscillaridin were heated briefly to boiling in 50 ml. of acetone with 1 g. of boric acid. Thereafter, the clear solution was cooled to 40° C., combined with 20 ml. of methyl iodide and 10 g. of silver oxide, and stirred for 16 hours at 40° C. The batch was filtered, the residue thoroughly washed with ethyl acetate, and the filtrate evaporated. Column chromatography on inactivated silica gel on a column 90 x 5 cm. gave:

0.84 g. of proscillaridin-dimethylether mixture (16% of theory), $R_f$-value=0.47–0.59 in ethyl acetate; and 3.04 g. of proscillaridin-monomethylether mixture (59% of theory), $R_f$-value=0.28–0.37 in ethyl acetate.

After crystallization from 30 ml. of ethyl acetate, 1.84 g. of crystalline proscillaridin-3'-methyl ether are obtained (36 percent of theory), $R_f$-value=0.30 in ethyl acetate; m.p.=231°–240° C.

EXAMPLE 4

5 g. of proscillaridin were stirred for 6 hours at 20 °C. in 100 ml. of tetrahydrofuran with 20 ml. of ethyl iodide and 10 g. of silver oxide. The batch was worked up as described in Example 1.

After column chromatography on inactivated silica gel using a column 110 x 5 cm. and the system chloroform/acetone=4/1, the following are obtained: 2.26 g. of proscillaridin-monoethylether mixture (43% of theory, or 90% of theory calculated on the reacted starting material), $R_f$-value=0.47 in ethyl acetatae; and 2.63 g. of proscillaridin (53 percent of the starting material).

Crystallization of the proscillaridin-monoethylether mixture from 10 ml. of ethyl acetate gave 0.77 g. of proscillaridin-3'-ethyl ether (15 percent of theory, or 31 percent of theory calculated on the reacted starting material), $R_f$-value=0.47 in ethyl acetate; m.p.=238°–249° C.

EXAMPLE 5

5 g. of proscillaridin were stirred at 20° C. for 70 minutes with 33 ml. of methyl iodide and 2.5 g. of finely-powdered barium hydroxide in 100 ml. of dimethylformamide. The batch was taken up into 500 ml. ethyl acetate, shaken twice with 5 percent aqueous HCl, then twice with 5 percent aqueous sodium hydroxide, and, finally, twice with water. The organic phase was dried over anhydrous sodium sulfate and evaporated.

After column chromatography on inactivated silica gel using a column 80 x 5 cm. and the system chloroform/acetone=3/1, the following are obtained: 0.98 g. of proscillaridin-dimethylether mixture of (19% of theory), $R_f$-value=0.47–0.59 in ethyl acetate; and 3.46 g. of proscillaridin-monomethylether mixture (67 percent of theory), $R_f$-value=0.28–0.37 in ethyl acetate.

Crystallization of the proscillaridin-monomethylether mixture from 35 ml. of ethyl acetate gave 2.23 g. of crystalline proscillaridin-3'-methyl ether (44 percent of theory), $R_f$-value=0.30 in ethyl acetate; m.p.=248°–255° C.

EXAMPLE 6

5 g. of proscillaridin were stirred in 50 ml. of dimethylformamide with 5 ml. of methyl iodide and 3.5 g. of finely-powdered barium hydroxide for 1 hour at 20° C. The product was further worked up as described in Example 5. After column chromatography the following were obtained:

1.61 g. of proscillaridin-dimethylether mixture (31 percent of theory), $R_f$-value=0.47–0.59 in ethyl acetate; and 2.34 g. of proscillaridin-monomethylether mixture (46 percent of theory), $R_f$-value=0.28–0.37 in ethyl acetate.

Crystallization of the proscillaridin monomethylether mixture from 25 ml. of ethyl acetate gave 1.68 g. of proscillaridin-3'-methyl ether (33 percent of theory), $R_f$-value=0.30 in ethyl acetate; m.p.=233°–240° C.

EXAMPLE 7

5 g. of proscillaridin were briefly heated to boiling in 100 ml. of dimethylformamide with 33 ml. of methyl iodide, 33 g. of finely-powdered barium oxide, and 1.4 g. of finely-powdered barium hydroxide, and then stirred for a further two hours at 20° C. The product was worked up as described in Example 5.

After column chromatography the following were obtained:

1.27 g. of a non-polar fraction which comprises proscillaridin-tri- and -di-methyl ethers, as well as other non-polar by-products; and 1.35 g. of proscillaridin-monomethylether mixture (26 percent of theory), $R_f$-value=0.28–0.37 in ethyl acetate.

Crystallization of the proscillaridin-monomethylether mixture from 50 ml. of ethyl acetate gave 0.77 g. of crystalline proscillaridin-3'-methylether (15% of theory), $R_f$-value=0.30 in ethyl acetate; m.p.=233°–239.5° C.

EXAMPLE 8

2.5 g. of finely-powdered barium hydroxide were stirred for 16 hours at 20° C. in 100 ml. dimethylformamide. 5 g. of proscillaridin and 33 ml. of methyl iodide were then added and the batch was stirred for another 60 minutes at 20° C. Further working up followed as described in Example 5.

After column chromatography the following were obtained:

0.36 g. of proscillaridin-dimethylether mixture (7 percent of theory), $R_f$-value=0.47–0.59 in ethyl acetate; and 2.79 g. of proscillaridin-monomethylether mixture (54 percent of theory), $R_f$-value=0.28–0.37 in ethyl acetate.

Crystallization of the proscillaridin monomethylether mixture from 30 ml. of ethyl acetate gave 1.5 g. of crystalline proscillaridin-3'-methyl ether (31 percent of theory), $R_f$-value=0.30 in ethyl acetate; m.p.=234°–240° C.

EXAMPLE 9

3 g. of finely-powdered barium hydroxide were stirred for 16 hours in 50 ml. of dimethylformamide at 20° C. 5 g. of proscillaridin and 5 ml. of methyl iodide were then added and the batch was stirred for a further 45 minutes at 20° C. The material was then worked up as described in Example 5.

After column chromatography, the following are obtained:

1.06 g. of proscillaridin-dimethylether mixture (20 percent of theory), $R_f$-value=0.47–0.59 in ethyl acetate; and 3.91 g. of proscillaridin-monomethylether mixture (76 percent of theory), $R_f$-value=0.28–0.37 in ethyl acetate.

Crystallization of the proscillaridin-monomethylether mixture from 40 ml. of ethyl acetate gave 2.75 g. of crystalline proscillaridin-3'-methylether (54% of theory), $R_f$-value=0.30 in ethyl acetate; m.p.=246°–252° C.

Ten further batches prepared analogously with reaction times of from 20 to 30 minutes gave from 0.79 g. to 1.39 g. of dimethylether mixture (15–27 percent of theory) and 3.33 to 4.01 g. of proscillaridin-monomethylether mixture (65–78 percent of theory), and, after crystallization from ethyl acetate, 2.40 to 2.99 g. of crystalline proscillaridin-3'-methyl ether (47–58 percent of theory).

A 19-oxo-proscillaridin-monomethylether mixture having an $R_f$-value of 0.23–0.27 in ethyl acetate is obtained in analogous fashion. After crystallization from ethyl acetate, pure 19-oxo-proscillaridin-3'-methyl ether is obtained, m.p.=226°–230° C., $R_f$-value=0.23 in ethyl acetate.

EXAMPLE 10

9.91 g. of proscillaridin-monomethylether mixture (from the mother liquor remaining after the crystallization of proscillaridin-3′-methyl ether in Example 9) were subjected to countercurrent distribution in a system involving 100 tubes and 2000 transfers using the system carbon tetrachloride/chloroform/methanol/water=2/2/3/1

($V$=25/25 ml.; $T$=20° C.).

After 100 transfers in the basic process, a process involving alternate phase removal was employed in which the ratio of the removed upper phases to the lower phases was about 3:2 (in total, 1234 upper phase transfers and 766 lower phase transfers).

The following were obtained in the tubes:

0–38: 1.21 g. of a mixture comprising proscillaridin-2′- and -4′-methyl ethers, $R_f$-value=0.28 and 0.37 in ethyl acetate;

39–74: 1.37 g. of proscillaridin-2′-methylether, $R_f$-value=0.28 in ethyl acetate; crystals from ethyl acetate, m.p.=151.5°–158.5° C.;

75–100: 0.52 g. of a mixture of proscillaridin-2′- and -3′-methyl ethers, $R_f$-value=0.28–0.39 in ethyl acetate.

The discarded lower and upper phases contained proscillaridin-4′- and -3′-methyl ethers.

EXAMPLE 11

5 g. of proscillaridin were stirred for one hour at 20° C. in 100 ml. of dimethylformamide with 25 ml. of ethyl iodide and a suspension of about 50 percent sodium hydride in oil. The batch was combined with 500 ml. of ethyl acetate, shaken three times with 500 ml. portions of water, with each aqueous phase being washed again with 500 ml. of ethyl acetate. The combined organic phases were dried over anhydrous sodium sulfate, evaporated, and the residue chromatographed on inactivated silica gel with a column 100 x 5 cm. using the system chloroform/acetone=4/1–1/1. The following were obtained:

0.48 g. of proscillaridin-diethylether mixture, $R_f$-value=0.5 in chloroform/acetone=4/1;

2.17 g. of proscillaridin-monoethylether mixture, $R_f$-value=0.47 in ethyl acetate; and 1.77 g. of proscillaridin (35% of the unchanged starting material).

With 1.0 g. of a 50 percent sodium hydride-oil suspension, instead of 0.5 g., the following are obtained under otherwise identical conditions:

0.30 g. of proscillaridin-triethyl ether, $R_f$-value=0.9 in chloroform/acetone=4/1;

1.06 g. of proscillaridin-diethylether mixture;

2.82 g. of proscillaridin-monoethylether mixture; and 0.24 g. of proscillaridin (5 percent of the unchanged starting material).

In an analogous fashion, proscillaridin monopropylether mixtures, $R_f$-value=0.55 in ethyl acetate, and proscillaridin monopentylether mixtures, $R_f$-value=0.60 in ethyl acetate, are obtained in small yields from proscillaridin and propyl iodide and pentyl iodide respectively.

In the methylation of proscillaridin, the sodium hydride-oil suspension can also be replaced by sodium methylate. The yields of proscillaridin monomethylether mixture are, however, smaller than with sodium hydride.

EXAMPLE 12

2.5 g. of proscillaridin-2′,3′-acetonide were stirred for 20 hours at 20° C. in 50 ml. of dimethylformamide with 15 ml. of methyl iodide and 15 g. of silver oxide. The material was further worked up as described in Example 2. After column chromatography on inactivated silica gel on a column 100 x 4 cm. with the system chloroform/ethyl acetate=10/1, the following are obtained:

1.90 g. of proscillaridin-2′,3′-acetonide-4′-methyl ether (74 percent of theory), amorphous, $R_f$-value=0.67 in chloroform/ethyl acetate=1/1.

EXAMPLE 13

10 g. of proscillaridin-2′,3′-acetonide were boiled for 6 hours in 200 ml. of acetone with 200 ml. of ethyl iodide and 50 g. of silver oxide. The material was worked up further as described in Example 1. After column chromatography on inactivated silica gel on a column 140 x 3 cm. with the system chloroform/ethyl acetate=4/1–1/1, the following are obtained:

1.63 g. of proscillaridin-2′,3′-acetonide-4′-ethyl ether (66 percent of theory calculated on the reacted starting material), amorphous, $R_f$-value=0.71 in chloroform/ethyl acetate=1/1; and 7.64 g. of proscillaridin-2′,3′-acetonide recovered unchanged.

EXAMPLE 14

1 g. of proscillaridin-2′,3′-acetonide-4′-ethyl ether was stirred in 50 ml. of 0.2 N hydrochloric acid in tetrahydrofuran for 8 hours at 20° C. The batch was taken up into 200 ml. of ethyl acetate, the organic phase was shaken once with 200 ml. of 5 percent aqueous sodium hydroxide and twice with water, dried over anhydrous sodium sulfate, and evaporated. The residue was chromatographed on inactivated silica gel in a column 100 x 3 cm. with the system chloroform/ethyl acetate=4/1.

The following are obtained:

0.14 g. of proscillaridin - 2′,3′ - acetonide-4′-ethyl ether ($\cong$14 percent unconverted starting material, $R_f$-value=0.71 in chloroform/ethyl acetate=1/1; and 0.46 g. of proscillaridin-4′-ethyl ether (48 percent of theory), $R_f$-value=0.48 in ethyl acetate; crystals from ethyl acetate, m.p.=182°–192° C.

EXAMPLE 15

5 g. of proscillaridin-2′,3′-acetonide were dissolved in 50 ml. of dimethylformamide and stirred with 10 ml. of methyl iodide and 1 g. of a 50 percent sodium hydride-oil suspension for 15 minutes at 20° C. After further working up as in Example 10 and column chromatography on inactivated silica gel with a column 120 x 5 cm. using the system chloroform/ethyl acetate=5/1, are obtained: 3.83 g. of proscillaridin-2′,3′-acetonide-4′-methyl ether (75 percent of theory), amorphous, $R_f$-value=0.67 in chloroform/ethyl acetate=1/1.

EXAMPLE 16

5 g. of proscillaridin-2′,3′-acetonide were dissolved in 50 ml. of dimethylformamide and stirred with 10 ml. of ethyl iodide and 1 g. of a 50 percent sodium hydride-oil suspension for 15 minutes at 20° C. After further working up as in Example 10 and column chromatography on inactivated silica gel in a column 140 x 5 cm. using the system chloroform/ethyl acetate=5/1, the following are obtained: 1.50 g. of proscillaridin-2′,3′-acetonide-4′-ethyl ether (29 percent of theory), amorphous, $R_f$-value=0.71 in chloroform/ethyl acetate=1/1.

In an analogous fashion, small yields of proscillaridin-2′,3′-acetonide-4′-propyl ether, $R_f$-value=0.74 in chloroform/ethyl acetate=1/1, and of proscillaridin-2′,3′-acetonide-4′-pentyl ether, $R_f$-value=0.75 in chloroform/ethyl acetate=1/1 are obtained from proscillaridin-2′,3′-acetonide and propyl iodide and pentyl iodide, respectively.

EXAMPLE 17

4 charges, each comprising 10 g. of proscillaridin-2′,3′-acetonide, 100 ml. of dimethylformamide, 20 ml. of methyl iodide, and 6 g. of finely-powdered barium hydroxide, were stirred for 3 hours at 20° C.

The batches were combined and further worked up according to Example 5. The residue on evaporation was chromatographed on inactivated silica gel on a column 160 x 6 cm. with the system chloroform/ethyl acetate= 4/1. Recovered starting material was resubmitted to methylation according to the preceding description, and the starting material recovered was once more methylated according to the procedure given. After three methylations and three column chromatographs, the following materials are obtained in total: 26.82 g. of proscillaridin-2',3'-acetonide-4'-methylether (65 percent of theory or 76 percent of theory calculated on the reacted starting material), amorphous, $R_f$-value=0.67 in chloroform/ethyl acetate= 1/1; and 5.64 g. of proscillaridin-2',3'-acetonide (14 percent of the starting material).

In an analogous fashion, 19-oxo-proscilliaridin-2',3'-acetonide-4'-methyl ether is obtained, amorphous, $R_f$-value= 0.25 in chloroform/ethyl acetate=1/1.

EXAMPLE 18

25 g. of proscillaridin-2',3'-acetonide-4'-methyl ether were stirred for 18 hours at 20° C. in 1.25 l. of 0.2 N hydrochloric acid in tetrahydrofuran. The batch was further worked up as described in Example 14 and the residue obtained on evaporation was chromatographed on inactivated silica gel with a column 160 x 6 cm. with the system chloroform/ethyl acetate=1/1-pure ethyl acetate. The following are obtained: 8.93 g. of proscillaridin-4'-methylether (39 percent of theory), $R_f$-value=0.37 in ethyl acetate, crystals from ethyl acetate, m.p. 197°–204.5° C.

EXAMPLE 19

1.8 g. of 19-oxo-proscillaridin-2',3'-acetonide-4'-methyl ether were stirred for 6 hours at 20° C. in 90 ml. of 0.2 N hydrochloric acid in tetrahydrofuran. The batch was further worked up as described in Example 14 and the residue obtained on evaporation was chromatographed on inactivated silica gel on a column 100 x 4 cm. with ethyl acetate. In this fashion are obtained:

0.37 g. of 19-oxo-proscillaridin-2',3'-acetonide-4'-methyl ether ($\cong$21 percent of the starting material employed), $R_f$-value=0.25 in chloroform/ethyl acetate=1/1; and
0.96 g. of 19-oxo-proscillaridin-4'-methyl ether (57 percent of theory), $R_f$-value=0.27 in ethyl acetate, crystals from ethyl acetate, m.p.=222°–229° C.

EXAMPLE 20

5 g. of proscillaridin were dissolved in 100 ml. of dimethylformamide and stirred for one hour at 20° C. with 20 ml. of methyl iodide and 2.0 g. of an about 50 percent sodium hydride-oil suspension. After further working up as in Example 10, followed by column chromatography on inactivated silica gel with a column 120 x 4 cm. using the system chloroform/ethyl ester=2/1, the following were obtained: 1.74 g. of proscillaridin-trimethyl ether (32 percent of theory), $R_f$-value=0.40 in chloroform/ethyl acetate=1/1, crystals from methanol, m.p.=121°–124° C.; 2.19 g. of proscillaridin-dimethylether mixture (42 percent of theory), $R_f$-value=0.47–0.59 in ethyl acetate; and 0.37 g. of proscillaridin-monomethylether mixture (7 percent of theory), $R_f$-value=0.28–0.37 in ethyl acetate.

EXAMPLE 21

10 g. of proscillaridin were stirred for 3 hours at 20° C. in 200 ml. dimethylformamide with 60 ml. of methyl iodide and 12 g. of finely-powdered barium hydroxide. The batch was further worked up as described in Example 5, and the evaporation residue was chromatographed on inactivated silica gel in a column 120 x 5 cm. with the system chloroform/ethyl acetate=4/1. In this manner are obtained:

3.02 g. of proscillaridin-2',3',4'-trimethyl ether (28 percent of theory), $R_f$-value=0.40 in chloroform/ethyl acetate=1/1, crystals from methanol, m.p.=119°–123° C.; and
6.15 g. of proscillaridin dimethylether mixture (58 percent of theory), after thin layer chromatography, approximately 90 percent of proscillaridin-2',3'-dimethyl ether is obtained, $R_f$-value=0.47–0.59 in ethyl acetate.

A further methylation of the diethylether mixture according to the procedure described above, followed by chromatography on a column 120 x 5 cm. with the system chloroform/ethyl acetate=4/1 produces the further products:

1.98 g. of proscillaridin-2',3',4'-trimethyl ether (total=46 percent of theory), $R_f$-value=0.40 in chloroform/ethyl acetate=1/1; and
3.36 g. of proscillaridin-2',3'-dimethyl ether (32 percent of theory), $R_f$-value=0.47 in ethyl acetate, crystals from a small amount of ethyl acetate, m.p.=136°–140.5° C.

19-oxo-proscillaridin-2',3',4'-trimethyl ether, amorphous, $R_f$-value=0.23 in chloroform/ethyl acetate=1/1, and 19-oxo-proscillaridin-2',3'-dimethyl ether, amorphous, $R_f$-value=0.34 in ethyl acetate, are obtained in an analogous manner.

EXAMPLE 22

5 g. of proscillaridin-4'-methyl ether were stirred for 80 minutes at 20° C. in 50 ml. of dimethylformamide with 5 ml. of methyl iodide and 2 g. of finely-powdered barium hydroxide. The product was further worked up as described in Example 5. After column chromatography on inactivated silica gel using a column 100 x 5 cm. and the system chloroform/ethyl acetate=1/1, the following products are obtained:

0.90 g. of proscillaridin-2',3',4'-trimethyl ether (17 percent of theory), $R_f$-value=0.40 in chloroform/ethyl acetate=1/1, crystals from methanol, m.p.=124°–129° C.;
2.68 g. of a mixture of proscillaridin-2',4'- and -3',4'-dimethyl ethers (51 percent of theory), $R_f$-value=0.55–0.59 in ethyl acetates; and
0.23 g. of proscillaridin-4'-methyl ether ($\cong$5 percent of the starting product), $R_f$-value=0.37 in ethyl acetate.

In an analogous fashion, starting from 19-oxo-proscillaridin-4'-methy ether, a mixture of 19-oxo-proscillaridin-2',4'- and -3',4'-dimethyl ethers is obtained, $R_f$-value= 0.41 in ethyl acetate.

From proscillaridin-2'-methyl ether, a mixture of proscillaridin-2',3'- and -2',4'-dimethyl ethers, $R_f$-value=0.47 and 0.55 in ethyl acetate, is obtained. After thin layer chromatography, the mixture comprises about 90 percent of proscillaridin-2',3'-dimethyl ether and about 10 percent of proscillaridin-2',4'-dimethyl ether. The mixture can be separated into its pure components by column chromatography.

In the same manner, a mixture of proscillaridin-2',3'- and -3',4'-dimethyl ethers, $R_f$-value=0.47 and 0.59 in ethyl acetate, is obtained from proscillaridin-3'-methyl ether. After thin layer chromatography, the mixture comprises about 90 percent of proscillaridin-2',3'-dimethyl ether and about 10 percent of proscillaridin-3',4'-dimethyl ether. The mixture can be separated into its pure components by column chromatography.

EXAMPLE 23

2.68 g. of a mixture of proscillaridin-2',4'- and -3',4'-dimethyl ethers (obtained according to Example 20) were subjected to countercurrent distribution in 100 tubes for 550 transfers using the system carbon tetrachloride/chloroform/methanol/water=3/1/3/1 ($V$=25/25 ml.; $T$=20° C.). After 100 steps in the basic process and 50 steps removing the upper phase, a process of alternate phase removal was employed with the relationship between the removed upper phase to the lower phase of about 13:7 (in total 405 upper phase transfers and 145 lower phase transfers). The following materials are obtained in the tubes:

18–47: 0.89 g. of proscillaridin-3',4'-dimethyl ether, $R_f$-value=0.59 in ethyl acetate, crystals from ethyl acetate, m.p.=218.5–223° C.;

48-63: 0.80 g. of a mixture of proscillaridin-2',4'- and -3',4'-dimethyl ethers, $R_f$-value=0.55 and 0.59 in ethyl acetate;

64-99: 0.82 g. of proscillaridin-2',4'-dimethyl ether, $R_f$-value=0.55 in ethyl acetate, crystals from ethyl acetate, m.p.=210.5°–214° C.

A mixture of 19-oxo-proscillaridin-2',4'- and -3',4'-dimethyl ethers can be separated into its pure components in a similar manner.

EXAMPLE 24

200 mg. of proscillaridin-4'-methyl ether were combined in 5 ml. of absolute pyridine with 5 ml. of acetic anhydride and left to stand for 24 hours at 20° C. 10 ml. of methanol were then added to the reaction mixture to destroy excess acetic anhydride. After 1 hour at 20° C., the mixture was taken up with 200 ml. of ethyl acetate, the organic phase extracted twice with 200 ml. portions of 5 percent aqueous HCl, twice with 200 ml. portions of 5 percent aqueous NaOH, and twice with 200 ml. portions of water, dried over anhydrous sodium sulfate, and evaporated. Column chromatography of the evaporation residue on inactivated silica gel using a column 60 x 2 cm. with the system chloroform/ethyl acetate=4/1 produces: 202 mg. of proscillaridin-4'-methyl ether-2',3'- diacetate (88 percent of theory), amorphous, $R_f$-value=0.55 in chloroform/ethyl acetate=1/1.

The following products are synthesized by identical procedures from the indicated starting materials:

Proscillaridin - 2' - methyl ether: Proscillaridin-2'-methyl ether-3',4'-diacetate, amorphous, $R_f$-value=0.51 in chloroform/ethyl acetate=1/1;

Proscillaridin - 3'-methyl ether: Proscillaridin-3'-methyl ether-2',4'-diacetate, amorphous, $R_f$-value=0.59 in chloroform/ethyl acetate=1/1;

Proscillaridin-2',3'-dimethyl ether: Proscillaridin-2',3'-dimethyl ether-4'-acetate, amorphous, $R_f$-value=0.38 in chloroform/ethyl acetate=1/1;

Proscillaridin-2',4'-dimethyl ether: Proscillaridin-2',4'- dimethyl ether-3'-acetate, amorphous, $R_f$-value=0.50 in chloroform/ethyl acetate=1/1;

Proscillaridin-3',4'-dimethyl ether: Proscillaridin-3',4'- dimethyl ether-2'-acetate, amorphous, $R_f$-value=0.49 in chloroform/ethyl acetate=1/1;

Proscillaridin-3'-ethyl ether: Proscillaridin-3'-ethyl ether-2',4'-diacetate, amorphous, $R_f$-value=0.57 in chloroform/ethyl acetate=1/1; and Proscillaridin-4'-ethyl ether: Proscillaridin-4'-ethyl ether-2',3'-diacetate, amorphous, $R_f$-value=0.56 in chloroform/ethyl acetate=1/1.

In an analogous fashion, 19-oxo-proscillaridin-methyl ether-acetates can be prepared from the corresponding 19-oxo-proscillaridin-methyl ethers.

EXAMPLE 25

1 g. of proscillaridin-dimethyl ether mixture (comprising about 80 percent proscillaridin-2',3'-dimethyl ether) were combined in 10 ml. absolute pyridine with 10 ml. of acetic anhydride and left to stand for 24 hours at 20° C. The material was further worked up as described in Example 24. After column chromatography on inactivated silica gel using a column 120 x 3 cm. and the system chloroform/ethyl acetate = 4/1, the following are obtained:

0.12 g. of a mixture of proscillaridin-2',4'-dimethyl ether-3'-acetate and -3',4'-dimethyl ether-2'-acetate (11 percent of theory), $R_f$-value=0.50 in chloroform/ethyl acetate=1/1; and 0.73 g. of proscillaridin-2',3'-dimethyl ether-4'-acetate (68 percent of theory), $R_f$-value=0.38 in chloroform/ethyl acetate=1/1.

EXAMPLE 26

10 g. of proscillaridin-3'-methyl ether were combined in 100 ml. of absolute pyridine with 10 ml. of acetic anhydride and left to stand for two hours at 20° C. The material was further worked up as described in Example 24. After column chromatography on inactivated silica gel using a column 120 x 5 cm. and the system chloroform/acetone=3/1, the following are obtained:

1.62 g. of proscillaridin-3'-methyl ether-2',4'-diacetate (14 percent of theory), amorphous, $R_f$-value=0.54 in chloroform/ethyl acetate=1/1;

0.36 g. of proscillaridin-3'-methyl ether-2'-acetate (3 percent of theory), amorphous, $R_f$-value=0.72 in ethyl acetate;

5.39 g. of proscillaridin-3'-methyl ether-4'-acetate (50 percent of theory), amorphous, $R_f$-value=0.69 in ethyl acetate;

2.92 g. of proscillaridin-3'-methyl ether ($\cong$29 percent of recovered starting material), $R_f$-value=0.30 in ethyl acetate.

Using an analogous procedure, a mixture of proscillaridin-2'-methyl ether-3'-acetate and -2'-methyl ether-4'-acetate, $R_f$-value=0.70–0.72 in ethyl acetate, is obtained from proscillaridin-2'-methyl ether; a mixture of proscillaridin-4'-methyl ether-2'-acetate and -4'-methyl ether-3'-acetate, both having an $R_f$-value=0.72 in ethyl acetate, is obtained from proscillaridin-4'-methyl ether.

What is claimed is:

1. An orally-administered pharmaceutical composition for the treatment of cardiac insufficiency, said composition comprising a pharmaceutically acceptable carrier and, as the active component thereof, a $\Delta^{4,20,22}$-bufatrienolide rhamnoside ether of the formula

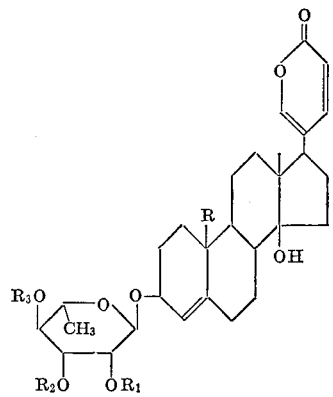

wherein R is methyl or formyl and $R_1$, $R_2$, and $R_3$ are hydrogen, methyl, ethyl, or acetyl, at least one of $R_1$, $R_2$, $R_3$ being hydrogen and at least one of $R_1$, $R_2$, $R_3$ being methyl or ethyl, said composition being administered in an amount providing from 0.5 to 3.0 milligrams of said active component per day.

2. A pharmaceutical composition as defined in claim 1 wherein the active compound is proscillaridin-2'-methyl ether.

3. A pharmaceutical composition as defined in claim 1 wherein the active compound is proscillaridin-3'-methyl ether.

4. A pharmaceutical composition as defined in claim 1 wherein the active compound is proscillaridin-4'-methyl ether.

5. A pharmaceutical composition as defined in claim 1 wherein the active compound is proscillaridin-2'-,3'-dimethyl ether.

6. A pharmaceutical composition as defined in claim 1 wherein the active compound is proscillaridin-2',4'-dimethyl ether.

7. A pharmaceutical composition as defined in claim 1 wherein the active compound is proscillardin-3,4'-dimethyl ether.

8. A pharmaceutical composition as defined in claim 1 wherein the active compound is proscillaridin-2'-3',4'-trimethyl ether.

9. A pharmaceutical composition as defined in claim 1 wherein the active compound is 19-oxo-procillaridin-3'-methyl ether.

10. A pharmaceutical composition as defined in claim 1 wherein the active compound is 19-oxo-proscillaridin-4'-methyl ether.

11. A pharmaceutical composition as defined in claim 1 wherein the active compound is proscillaridin-3'-methyl ether-4'-acetate.

12. A pharmaceutical composition as defined in claim 1 wherein the active compound is proscillaridin-3'-methyl ether-2'-acetate.

13. A pharmaceutical composition as defined in claim 1 wherein the active compound is proscillaridin-3'-ethyl ether.

14. A pharmaceutical composition as defined in claim 1 wherein the active compound is proscillaridin-4'-ethyl ether.

15. A method for the treatment of cardiac insufficiency which comprises orally administering from 0.5 to 3.0 milligrams per day of a $\Delta^{4,20,22}$-bufatrienolide rhamnoside ether of the formula

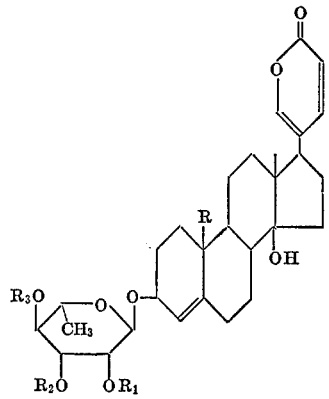

wherein R is methyl or formyl and $R_1$, $R_2$, and $R_3$ are hydrogen, methyl, ethyl, or acetyl, at least one of $R_1$, $R_2$, $R_3$ being hydrogen and at least one of $R_1$, $R_2$, $R_3$ being methyl or ethyl.

No references cited.

RICHARD L. HUFF, Primary Examiner

UNITED STATES PATENT OFFICE
CERTIFICATE OF CORRECTION

Patent No. 3,836,646          Dated September 17, 1974

Inventor(s) Hugo Kubinyi

It is certified that error appears in the above-identified patent and that said Letters Patent are hereby corrected as shown below:

In the Heading:

After "Ser. No. 311,249," insert -- Claim priority, application Germany, February 28, 1969, P 19 10 207.9 --.

Signed and sealed this 31st day of December 1974.

(SEAL)
Attest:

McCOY M. GIBSON JR.          C. MARSHALL DANN
Attesting Officer            Commissioner of Patents